US009094799B2

(12) United States Patent
Kwon et al.

(10) Patent No.: US 9,094,799 B2
(45) Date of Patent: Jul. 28, 2015

(54) MOBILE TERMINAL AND METHOD FOR SHARING LOCATION INFORMATION BETWEEN USERS

(71) Applicant: Electronics and Telecommunications Research Institute, Daejeon (KR)

(72) Inventors: Seung-Joon Kwon, Seoul (KR); Won-Geun Choi, Seoul (KR); Young-Jae Lim, Daejeon (KR); Ji-Sang Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 230 days.

(21) Appl. No.: 13/838,181

(22) Filed: Mar. 15, 2013

(65) Prior Publication Data
US 2013/0288716 A1    Oct. 31, 2013

(30) Foreign Application Priority Data

Apr. 26, 2012 (KR) .......................... 10-2012-0043840

(51) Int. Cl.
*H04W 24/00* (2009.01)
*H04W 4/04* (2009.01)
*H04W 4/02* (2009.01)
*G01C 21/26* (2006.01)

(52) U.S. Cl.
CPC ............... *H04W 4/046* (2013.01); *H04W 4/025* (2013.01); *G01C 21/26* (2013.01)

(58) Field of Classification Search
CPC ....... H04W 4/02; H04W 64/00; H04W 4/021; H04W 4/023; H04W 4/008; H04W 4/04; H04W 4/025; H04W 8/005; H04W 64/003; G06Q 30/0261; G01S 5/0252; G01S 5/0242; G01S 11/06
USPC .................... 455/456.1–456.6, 457
See application file for complete search history.

(56) References Cited

U.S. PATENT DOCUMENTS

| | | | |
|---|---|---|---|
| 7,640,268 B2 * | 12/2009 | Gotoh et al. ................... | 701/532 |
| 8,392,116 B2 * | 3/2013 | Lehmann et al. .............. | 701/524 |
| 8,810,389 B2 * | 8/2014 | Park et al. ................. | 340/539.11 |
| 2002/0072356 A1 * | 6/2002 | Yamashita et al. ............ | 455/420 |
| 2004/0254985 A1 * | 12/2004 | Horstemeyer ................ | 709/205 |

(Continued)

FOREIGN PATENT DOCUMENTS

| JP | 2012056576 A | * | 3/2012 |
|---|---|---|---|
| KR | 10-2008-0095561 A | | 10/2008 |
| KR | 10-2012-0066450 A | | 6/2012 |

*Primary Examiner* — Magdi Elhag
(74) *Attorney, Agent, or Firm* — Rabin & Berdo, P.C.

(57) ABSTRACT

The present invention relates to a mobile terminal and method for sharing location information between users. The mobile terminal includes a user input unit for receiving destination information of a first user from the first user. A location information input unit receives origin information of the first user from a Global Positioning System (GPS) or a Near-Field Communication (NFC) payment module of public transportation which the first user gets on. A communication unit transmits the origin information and the destination information of the first user to a public transportation information system, and receives movement route information of the first user from the public transportation information system. A location estimation unit estimates a current location of the first user using time required by the first user corresponding to the movement route information.

17 Claims, 6 Drawing Sheets

(56) References Cited

U.S. PATENT DOCUMENTS

| | | |
|---|---|---|
| 2005/0174283 A1* | 8/2005 | Muramatsu et al. ..... 342/357.07 |
| 2008/0215237 A1* | 9/2008 | Perry ............................ 701/209 |
| 2009/0271109 A1* | 10/2009 | Lee et al. ...................... 701/208 |
| 2010/0076679 A1* | 3/2010 | Lee ............................... 701/208 |
| 2010/0225469 A1* | 9/2010 | Yoshioka et al. ........ 340/539.13 |
| 2010/0261486 A1* | 10/2010 | Sheha et al. ................. 455/457 |
| 2011/0046878 A1* | 2/2011 | Sung et al. ................... 701/206 |
| 2011/0084804 A1* | 4/2011 | Khorashadi et al. ........... 340/8.1 |
| 2011/0250937 A1* | 10/2011 | Hubbard et al. ................. 463/6 |
| 2012/0166367 A1* | 6/2012 | Murdock et al. ................. 706/12 |

\* cited by examiner

MOBILE TERMINAL AND METHOD FOR SHARING LOCATION INFORMATION BETWEEN USERS

CROSS REFERENCE TO RELATED APPLICATION

This application claims the benefit of Korean Patent Application No. 10-2012-0043840, filed on Apr. 26, 2012, which is hereby incorporated by reference in its entirety into this application.

BACKGROUND OF THE INVENTION

1. Technical Field

The present invention relates generally to a mobile terminal and method for sharing location information between users and, more particularly, to a mobile terminal and method that allow users having mobile terminals, such as smart phones, to share mutual location information and destination arrival information with one another.

2. Description of the Related Art

Recently, as the popularization of smart phones to which high-speed wireless Internet service, positioning technology based on a Global Positioning System (GPS), next-generation web technology, etc. are applied have greatly expanded, various application services using smart phones have been presented to customers. Among these application services, a Location Based Service (LBS) has attracted great attention of customers thanks to high availability and convenience. In particular, LBS related to the provision of location information includes a service for allowing a user to determine a current location and determine information about a movement route to a destination and information about public transportation, such as a subway or a bus, using a GPS, a notification service for indicating the arrival of the user at the destination, etc. In relation to this, Korean Unexamined Patent Application Publication No. 2012-0066450 discloses a method of calculating a current location of a user and providing path information using a GPS.

Such a location-based destination arrival notification service is a service that has recently been widely used, and denotes a service for notifying a user of arrival at a preset destination in the form of a Short Message Service (SMS) or a push message service when the user arrives at a preset destination by continuously tracking the location of a smart phone held by the user. Such a conventional location-based destination arrival notification service is configured to provide the service on the premise that the service is provided only when there is a single smart phone user. Destinations for which the destination arrival notification service can be provided are restrictively set to subway stations or bus stops. Further, since the user's smart phone simply determines whether the user has arrived at his or her destination while periodically checking the location of the smart phone using a GPS, a problem arises in that the power of the smart phone is continuously consumed.

Meanwhile, the conventional location-based destination arrival notification service is limited to a unidirectional service for notifying a single smart phone user of the arrival at the destination. Then, there is no service for sharing real-time location information required to mutually check the current locations of two or more smart phone users, such as friends or a couple who designated a specific destination as an appointed place, and determine whether the users have arrived at the destination.

Furthermore, a location-based application service has currently evolved and developed into the form of web-or mobile web-based application service, so that the creation of various web applications and the extension of users have been promoted. However, in regard to the sharing of mutual location information and the provision of destination arrival notification service, the implementation of technology using the mobile web has not yet been realized.

SUMMARY OF THE INVENTION

Accordingly, the present invention has been made keeping in mind the above problems occurring in the prior art, and an object of the present invention is to provide technology in which two or more users who received information about a movement route to a destination entered by the users from a public transportation information system can share, in real time, information about their movement route information, current location information, and information about whether they have arrived at the destination, with one another, in order to solve the problem of a conventional service for providing current location information and destination arrival notification, that is, the problem of being limited to unidirectional service for a single user and providing very limited location information.

Another object of the present invention is to provide Near-Field Communication (NFC)-based current location estimation technology that enables the current location of each user to be estimated in conjunction with an NFC device installed in public transportation, in order to solve the problem of a conventional mobile terminal having high power consumption because the conventional mobile terminal for providing location information to the user continuously uses a GPS module.

In accordance with an aspect of the present invention to accomplish the above objects, there is provided a mobile terminal for sharing location information between users, including a user input unit for receiving destination information of a first user from the first user; a location information input unit for receiving origin information of the first user from a Global Positioning System (GPS) or a Near-Field Communication (NFC) payment module of public transportation which the first user gets on; a communication unit for transmitting the origin information and the destination information of the first user to a public transportation information system, and receiving movement route information of the first user from the public transportation information system; and a location estimation unit for estimating a current location of the first user using time required by the first user corresponding to the movement route information, wherein the communication unit transmits the movement route information and the current location information to a location information sharing server, and receives movement route information and current location information of a second user from the location information sharing server.

Preferably, the origin information may be input to the location information input unit via an NFC tag reader put close to an NFC tag of public transportation which the first user gets on when the first user gets on the public transportation.

Preferably, the communication unit may receive operating route information and operating time information of the public transportation which the first user gets on from the public transportation information system.

Preferably, the location estimation unit may estimate the current location of the first user using the origin information of the first user input from the NFC tag reader and the operating route information and the operating time information received from the public transportation information system.

Preferably, the mobile terminal may further include a display unit for displaying the movement route and the current location of the first user or displaying the movement route and the current location of the second user.

Preferably, the display unit may display the current location of the first user on the movement route of the first user or the current location of the second user on the movement route of the second user using a mobile web viewer.

Preferably, if the current location of the first user estimated by the location estimation unit is identical to the destination of the first user input to the user input unit, the display unit may display a message indicating arrival of the first user at the destination.

Preferably, the communication unit may send the message indicating the arrival of the first user at the destination to the location information sharing server, and receive a message indicating arrival of the second user at the destination from the location information sharing server, and the display unit may display the message, indicating the arrival of the second user at the destination and received from the location information sharing server.

Preferably, the user input unit may be capable of receiving a command to select whether to move by walking or by public transportation from the first user.

Preferably, if the first user selects movement by walking, the location information input unit may receive the origin information of the first user from the GPS, and if the first user selects movement by public transportation, the location information input unit may receive the origin information of the first user from the NFC tag reader.

Preferably, the location information input unit may be capable of receiving the origin information of the first user from the first user.

In accordance with another aspect of the present invention to accomplish the above objects, there is provided a method of sharing location information between users, including a first mobile terminal receiving destination information of a first user from the first user; the first mobile terminal obtaining origin information of the first user from a Global Positioning System (GPS) or a Near-Field Communication (NFC) payment module of public transportation which the first user gets on; the first mobile terminal transmitting the origin information and the destination information of the first user to a public transportation information system; the first mobile terminal receiving movement route information corresponding to the origin information and the destination information of the first user from the public transportation information system; the first mobile terminal estimating a current location of the first user using time required by the first user corresponding to the movement route information; the first mobile terminal transmitting the movement route information and the current location information of the first user to a location information sharing server; and the first mobile terminal displaying movement route information and current location information of a second user.

Preferably, the estimating the current location of the first user may include if the first user gets on public transportation, the first mobile terminal obtaining origin information of the first user from an NFC tag reader put close to an NFC tag of the public transportation which the first user gets on.

Preferably, the estimating the current location of the first user may further include the first mobile terminal receiving operating route information and operating time information of the public transportation which the first user gets on from the public transportation information system.

Preferably, the estimating the current location of the first user may further include the first mobile terminal estimating the current location of the first user using the origin information of the first user input from the NFC tag reader and the operating route information and the operating time information received from the public transportation information system.

Preferably, the first mobile terminal transmitting the movement route information and the current location information of the first user to the location information sharing server may include the first mobile terminal requesting communication connection with the second mobile terminal from the location information sharing server; and if the communication connection with the second mobile terminal has been established by the location information sharing server, the first mobile terminal transmitting the movement route information and the current location information of the first user to the location information sharing server.

Preferably, the method may further include, after the first mobile terminal has estimated the current location of the first user, the first mobile terminal displaying the estimated current location of the first user.

Preferably, the method may further include determining whether the estimated current location of the first user is identical to the destination of the first user; and if the estimated current location of the first user is identical to the destination of the first user, the first mobile terminal displaying a message indicating arrival of the first user at the destination.

Preferably, the method may further include the first mobile terminal sending the message indicating the arrival of the first user at the destination to the location information sharing server; the location information sharing server sending the message indicating the arrival of the first user at the destination to the second mobile terminal; and the second mobile terminal displaying the message indicating the arrival of the first user at the destination.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Figure 1:
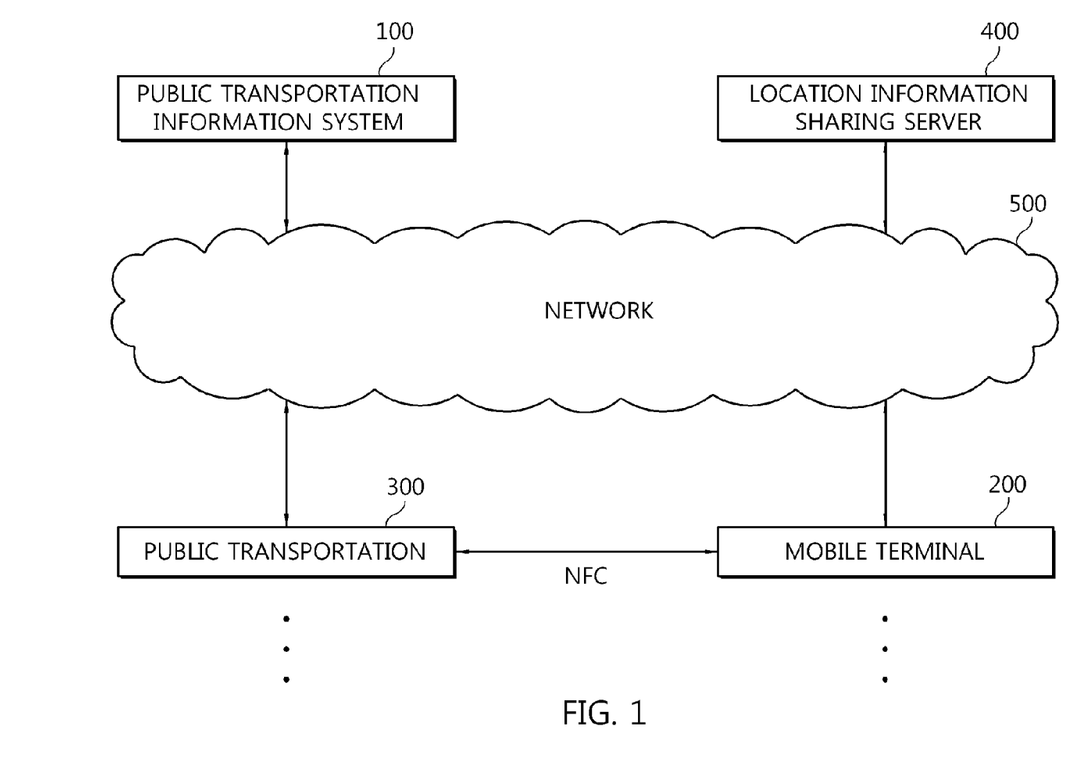
FIG. 1 is a diagram showing the configuration of a system for sharing location information between users, to which the present invention is applied.

FIG. 1 is a diagram showing the configuration of a system for sharing location information between users, to which the present invention is applied.

Referring to FIG. 1, the system for sharing location information between users to which the present invention is applied includes a public transportation information system 100, mobile terminals 200, public transportation 300, a location information sharing server 400, and a network 500. The public transportation information system 100 includes a system for providing users with operating information (operating route information, operating time information, etc.) related to various types of public transportation including buses, subways, etc., and a system for providing the users with movement route information obtained by searching for expected movement routes based on the origins and destinations of the users. The mobile terminals 200 are held by the users. The public transportation 300 includes various types of means of transportation which the users having the mobile terminals 200 get on for individual sections on a movement route through which the users pass until they arrive at the destination. The location information sharing server 400 transmits and receives the location information of the users (such as current location information, movement route information, and destination arrival information) to and from the mobile terminals 200. The network 500 is used to transmit and receive the location information of the users between the mobile terminal 200 and the location information sharing server 400.

Each of the mobile terminals 200 is internally equipped with a GPS module and is then capable of obtaining the location information of the user having the corresponding mobile terminal 200. Any type of mobile terminal can be used as the mobile terminal 200 as long as it is equipped with a Near-Field Communication (NFC) tag reader put close to an NFC tag provided in an NFC payment module installed in the public transportation 300 and can perform electronic payment required to use the public transportation 300. A smart phone, a tablet Personal Computer (PC), or the like that have recently been widely used may be, but is not limited to, an example of the mobile terminal.

The public transportation 300 includes therein an NFC payment module having an NFC tag for electronic payment with the mobile terminal 200. The NFC payment module of the public transportation 300 is configured to, when the mobile terminal 200 approaches the NFC tag and performs electronic payment, transmit the location information of the NFC payment module, together with payment information, to the NFC tag reader of the mobile terminal 200, thus enabling the mobile terminal 200 to obtain the embarkation location information of the user on the public transportation 300. The NFC payment module of the public transportation 300 can obtain the location information thereof based on the GPS, but is not limited thereto.

The location information sharing server 400 allows the plurality of mobile terminals 200 to share the location information of the users, received through the network 500, among the mobile terminals 200, processes mobile web page requests, and transmits and receives notification messages indicating the arrival of a specific user at a destination. The location information sharing server 400 transmits callback Uniform Resource Locator (URL) information, containing a webpage address that includes mutual route information, current location information, and messages indicating the arrival of users at the destination, to the users having the respective mobile terminals 200 connected over the network 500, thus allowing the users to view the corresponding information in real time via a mobile web page viewer.

Hereinafter, the configuration and operation of the mobile terminal for sharing location information between users according to the present invention will be described in detail.

Figure 2:
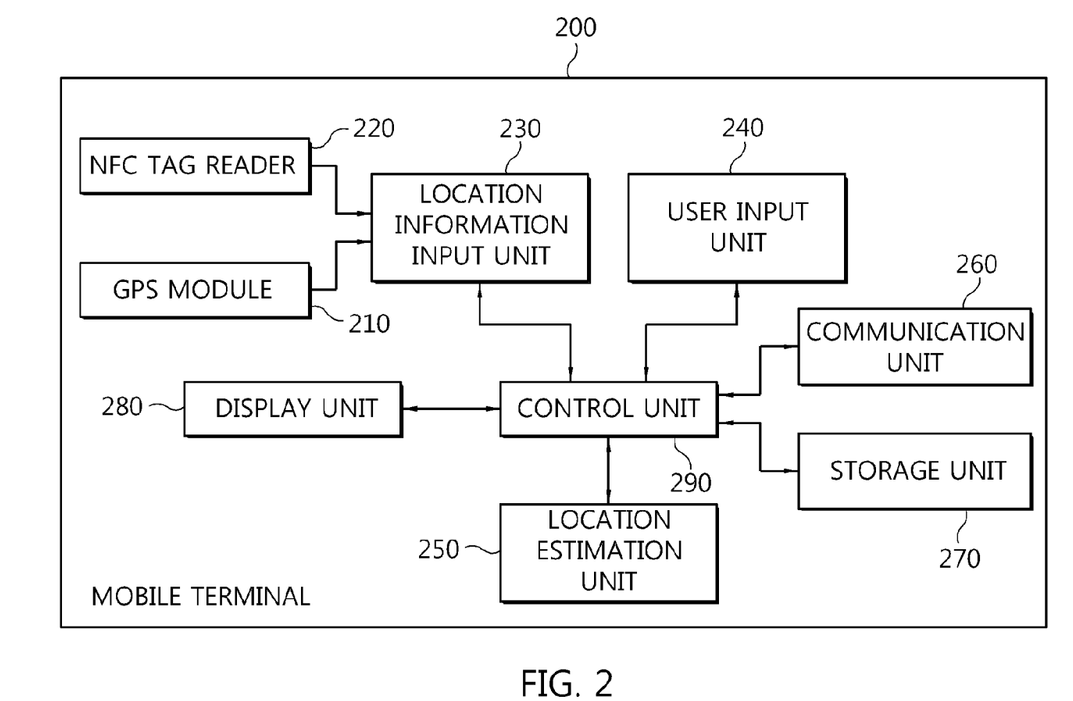
FIG. 2 is a block diagram showing the configuration of a mobile terminal for sharing location information between users according to the present invention.

FIG. 2 is a block diagram showing the configuration of a mobile terminal 200 for sharing location information between users according to the present invention.

Referring to FIG. 2, the mobile terminal 200 for sharing location information between users according to the present invention includes a GPS module 210, an NFC tag reader 220, a location information input unit 230, a user input unit 240, a location estimation unit 250, a communication unit 260, a storage unit 270, a display unit 280, and a control unit 290.

The GPS module 210 obtains information about the origin of a user using a GPS, and provides the obtained origin information of the user to the location information input unit 230.

The NFC tag reader 220 is configured to perform electronic payment when the user gets on the public transportation 300 and puts the mobile terminal 200 close to the NFC tag of the NFC payment module installed in the public transportation 300. In this case, the NFC tag reader 220 receives the embarkation location information of the user from the NFC payment module installed in the public transportation 300, and provides the embarkation location information to the location information input unit 230.

The location information input unit 230 receives the origin information of the user obtained from the GPS module 210, or receives the embarkation location information of the user on the public transportation 300 obtained from the NFC tag reader 220, and provides the received information to the location estimation unit 250. In this case, the location information input unit 230 can provide the embarkation location information of the user on the public transportation 300, obtained from the NFC tag reader 220, to the location estimation unit 250 as the origin information of the user.

The user input unit 240 receives information about a desired destination to head for from the user. Further, the user input unit 240 can directly receive information about the origin thereof from the user and provide the origin information to the location estimation unit 250. Meanwhile, the user input unit 240 can receive a command to select whether to move by walking or by public transportation 300 from the user. When the user input unit 240 receives a command to select movement by walking from the user, the location information input unit 230 receives the origin information of the user from the GPS module 210. In contrast, when the user input unit 240 receives a command to select movement by public transportation from the user, the location information input unit 230 receives the embarkation location information of the user from the NFC tag reader 220.

The location estimation unit 250 estimates the current location of the user by calculating a movement distance to the time required for the user to move to a current location on the basis of the origin of the user received from the location information input unit 230 and the movement route information of the user received from the public transportation information system 100 via the communication unit 260. Meanwhile, the location estimation unit 250 can estimate the current location of the user using the embarkation location information, received from the location information input unit 230 as the user gets on the public transportation 300, and the operating information (operating route information and operating time information) of the public transportation 300, received from the public transportation information system 100. That is, when the user gets on the public transportation 300, the location estimation unit 250 estimates the current location of the user by calculating the movement distance to the time required for the user to move to the current location after the got on the public transportation 300, on the basis of the embarkation location information received from the location information input unit 230 and the operating information of the public transportation 300 received from the public transportation information system 100. In this case, the current location of the user estimated by the location estimation unit 250 can be displayed to the user on the display unit 280. Further, if the estimated current location of the user is identical or approximate to the destination of the user input to the user input unit 240, the location estimation unit 250 determines that the user has arrived at the destination, and displays a notification message indicating the arrival of the user at the destination to the user on the display unit 280.

The communication unit 260 transmits the location information of the user obtained from the GPS module 210 and the destination information of the user input to the user input unit 240 to the public transportation information system 100, receives information about the movement route of the user corresponding to the location information and the destination information of the user from the public transportation information system 100, and provides the received information to the location estimation unit 250. Meanwhile, when the user gets on the public transportation 300, the communication unit 260 receives the operating information of the public transportation 300 which the user gets on from the public transportation information system 100, and provides the received operating information to the location estimation unit 250. Further, the communication unit 260 transmits the current location information estimated by the location estimation unit 250 and the movement route information to the location information sharing server 400, thus allowing the plurality of users having their own mobile terminals 200 to share their current location information and movement route information with one another. Furthermore, if the current location of a specific user estimated by the location estimation unit 250 is identical or approximate to the destination of the specific user input to the user input unit 240, the communication unit 260 sends a destination arrival notification message for the specific user to the location information sharing server 400, thus allowing the plurality of users having mobile communication terminals 200 to share their destination arrival information with one another.

The storage unit 270 stores the origin information or embarkation location information of the user that has been input to the location information input unit 230. Further, the storage unit 270 stores the destination information of the user that has been input to the user input unit 240. Meanwhile, the storage unit 270 may store the movement route information of the user received from the public transportation information system 100 and the current location information of the user estimated by the location estimation unit 250.

The display unit 280 displays the movement route received from the public transportation information system 100 and the current location of the user estimated by the location estimation unit 250. In this case, the display unit 280 can display the estimated current location of the user on the movement route of a mobile web viewer supported by a web interface provision module (not shown) on the basis of the movement route information of the user received from the public transportation information system 100 via the communication unit 260. Further, if it is determined by the location estimation unit 250 that the user has arrived at the destination, the display unit 280 may display a notification message indicating the arrival of the user at the destination. Meanwhile, when the current location information and the movement route information of some other user are received or when a notification message indicating the arrival of some other user at the destination is received, from the location information sharing server 400 via the communication unit 260, the display unit 280 may display the current location information and the movement route information of the other user or the destination arrival notification message for the other user.

The control unit 290 controls the operations of individual units of the mobile terminal 200 according to the present invention.

Figure 3:
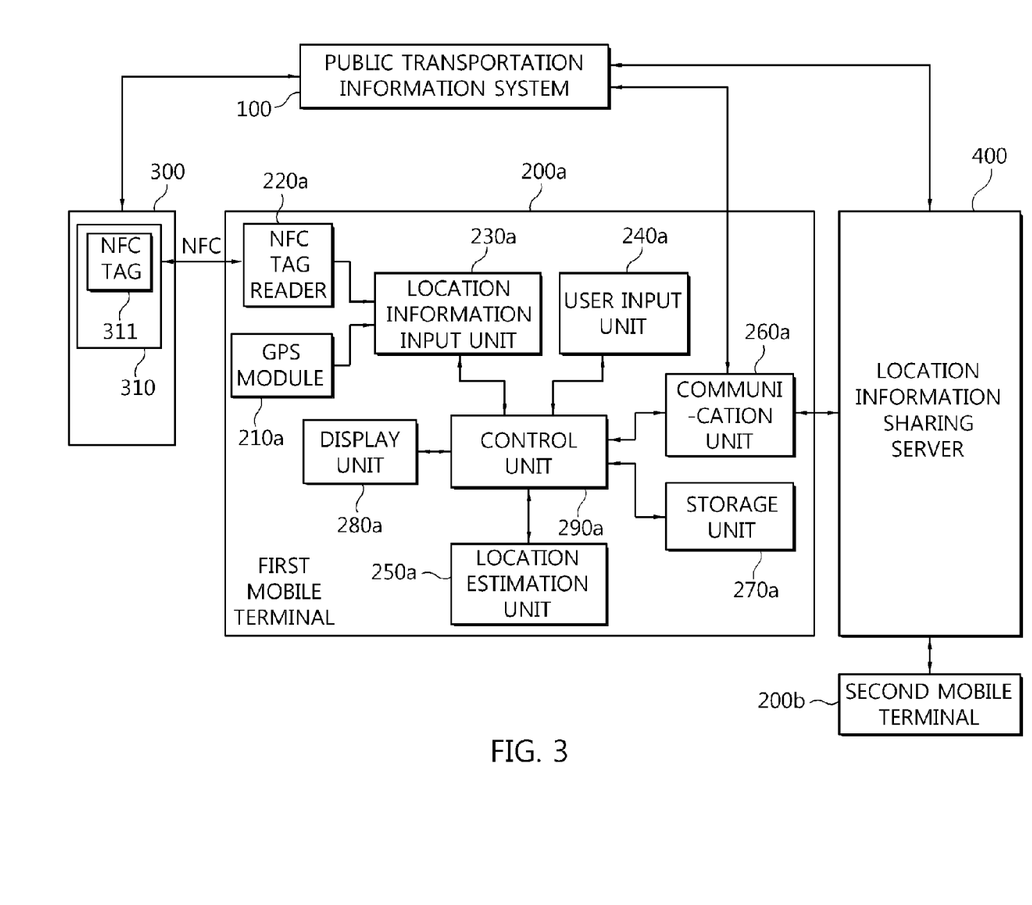
FIG. 3 is a diagram showing operations among first and second mobile terminals held by respective users, a public transportation information system, public transportation, and a location information sharing server.

FIG. 3 is a diagram showing operations performed among the first and second mobile terminals 200a and 200b held by respective users, the public transportation information system 100, the public transportation 300, and the location information sharing server 400 in order for a plurality of users who are heading for the same destination to share mutual location information with one another. In FIG. 3, only two mobile terminals 200a and 200b are shown for the sake of convenience of description. However, it is apparent that the number of mobile terminals is not limited thereto, and the present invention can be applied to three or more mobile terminals. Further, a network required to transmit and receive information among the first and second mobile terminals 200a and 200b, the public transportation information system 100, the public transportation 300, and the location information sharing server 400 is omitted in FIG. 3 for the sake of convenience of description.

Referring to FIG. 3, the first mobile terminal 200a held by a first user receives information about a desired destination to head for from the first user via a user input unit 240a while receiving information about the initial origin of the first user from a GPS module 210a or an NFC tag reader 220a. In this case, the first mobile terminal 200a transmits the origin information and the destination information of the first user to the public transportation information system 100 via a communication unit 260a, and receives the detailed movement route of the first user that has the origin as a starting point and has the destination as an end point from the public transportation information system 100.

Here, the detailed movement route information of the first user denotes a wayfinding route from the origin to the destination based on movement by walking or by public transportation 300. The detailed movement route information is implemented as a set of vertices that are routing points. A single vertex is defined as {(X coordinate, Y coordinate), (vertex node name), (vertex node type)}, and has information between vertices as attribute information. Further, the information between vertices is composed of {(distance between vertices), (means of transportation between vertices), (time required to move between vertices)}. Here, X and Y coordinates are coordinates based on the eastern origin of a Transverse Mercator (TM) that is a plane Cartesian coordinate system, and the vertex node name can be the name of a subway station, such as 'Sincheon Station', or the name of a bus stop such as 'Samho apartment'. Further, the vertex node type denotes the type of the station of the public transportation 300, such as a 'subway station' or a 'bus stop'. The distance between vertices denotes a movement distance of walking when the first user moves by walking, the number of subway stations when the first user uses the subway, and the number of bus stops when the first user uses a bus. The means of transportation between vertices has three types of attributes, that is, 'walking', 'subway', and 'bus', and the time required to move between vertices denotes the time required to move from a previous vertex to a subsequent vertex using the corresponding means of transportation.

The first user having the first mobile terminal 200a can be moved by walking or by the public transportation 300, such as a subway or a bus, during the procedure of departing from the initial origin and moving to the destination input to the user input unit 240a. First, when the means of transportation for the first section of the movement route information of the first user received from the public transportation information system 100 is walking, a location estimation unit 250a estimates the current location of the first user based on a movement route and required movement time from a previous vertex, which is the origin of the first user obtained from the GPS module 210a, to a subsequent vertex at which the first user will get on the public transportation 300. That is, the location estimation unit 250a extracts total required movement time required for the first section, in which the first user moves by walking, on the movement route information received from the public transportation information system 100, and compares time required for the first user to move from the origin to a current location with the extracted total required movement time, thus estimating the current location of the first user on the movement route.

Meanwhile, it is assumed that the means of transportation for the first section of the movement route information of the first user received from the public transportation information system 100 is the public transportation 300, such as a subway or a bus. In this case, when the first user gets on the public transportation 300 and puts an NFC tag reader 220a close to an NFC tag 311 provided in an NFC payment module 310 installed in the corresponding public transportation 300, the NFC tag reader 220a obtains the embarkation location information of the first user on the public transportation 300 from the NFC payment module 310, and transmits the embarkation location information to a location information input unit 230a. That is, when the first user gets on the public transportation 300 and puts the NFC tag reader 220a close to the NFC tag 311 of the corresponding public transportation 300, the location information input unit 230a receives the embarkation location information of the first user on the public transportation 300 from the NFC payment module 310 and the NFC tag reader 220a without receiving the origin information of the first user from the GPS module 210a, and provides the embarkation location information to the location estimation unit 250a as the origin of the first user. In this case, the communication unit 260a receives the operating information (operating route information and operating time information) of the corresponding public transportation 300 which the first user gets on from the public transportation information system 100, and provides the operating information to the location estimation unit 250a. In this case, the operating time information of the corresponding public transportation 300 may be the operating timetable of the subway or the bus that is the corresponding public transportation 300. Next, the location estimation unit 250a considers the current movement location of the corresponding public transportation 300 to be identical to the current movement location of the first user, and then estimates the current location of the first user. For this, the location estimation unit 250a estimates the current location of the first user based on the operating route information and operating time information of the corresponding public transportation 300 in the section from a previous vertex, which is the origin (embarkation location) of the first user obtained from the NFC tag reader 220a, to a subsequent vertex at which the first user will walk or get on another public transportation. That is, the location estimation unit 250a matches the time at which the first user gets on the corresponding public transportation 300 with the operating time information of the corresponding public transportation 300 received from the public transportation information system 100, and calculates a movement distance to the time required for the first user to move to the current location, based on the operating route information of the corresponding public transportation 300 and the origin (embarkation location) information of the first user, thus estimating the current location of the user.

When first user moves by the public transportation 300, gets off the public transportation 300, and then moves by walking during the procedure of moving to the destination, the location information input unit 230a receive the disembarkation location of the first user from the NFC tag reader 220a put close to the NFC tag 311 when the first user gets off the public transportation 300, and provides the disembarkation location of the first user to the location estimation unit 250a as the origin of the first user. If the user does not put the NFC tag reader 220a close to the NFC tag 311 when getting off the public transportation 300, the user input unit 240a receives a command to select movement by walking from the first user. In this case, the location information input unit 230a may receive the origin of the first user from the GPS module 210a and provide the origin information to the location estimation unit 250a. Further, the location estimation unit 250a considers the disembarkation location or origin of the first user received from the location information input unit 230a to be the origin of the first user, and estimates the current location of the first user in the same manner as when the means of transportation for the first section is walking, as described above.

Further, in the case where the first user moves by walking and gets on public transportation 300 during the procedure of moving to the destination, the location information input unit 230a receives the embarkation location of the first user from the NFC tag reader 220a put close to the NFC tag 311 when the first user gets on the public transportation 300, and provides the embarkation location to the location estimation unit 250a as the origin of the first user. Furthermore, the location estimation unit 250a estimates the current location of the first user in the same manner as when the means of transportation for the first section is the public transportation 300, as described above.

Accordingly, the mobile terminal 200 according to the present invention obtains the embarkation or disembarkation information of the user on the public transportation 300 using an NFC system that includes the NFC payment module 310 of the public transportation 300 and the NFC tag reader 220 provided in the mobile terminal 200, and estimates the current location of the user based on the obtained information. As a result, there is no need to continuously operate the GPS module 210a in the mobile terminal 200, thus greatly reducing the power consumption of the mobile terminal 200 for determining the current location of the user.

The first mobile terminal 200a displays the current location of the first user to the user on the display unit 280a if the current location of the first user has been estimated by the location estimation unit 250a. In this case, the display unit 280a may display the current location of the first user estimated by the location estimation unit 250a on the movement route of the first user received from the public transportation information system 100 by using a mobile web viewer supported by a web interface provision module (not shown).

In order for the first user having the first mobile terminal 200a and the second user having the second mobile terminal 200b to share the movement route information and the current location information of the first user with each other, the first and second mobile terminals 200a and 200b perform a communication connection operation via the location information sharing server 400. The first mobile terminal 200a performs a communication connection request operation by sending an SMS message, which contains the Uniform Resource Locator (URL) address information of a mobile web viewer and an authentication key, to the second mobile terminal 200b via the location information sharing server 400. Once communication between the first mobile terminal 200a and the second mobile terminal 200b has been connected, the first mobile terminal 200a transmits the movement route information and the current location information of the first user to the location information sharing server 400 via the communication unit 260a. The location information sharing server 400 transmits the movement route information and the current location information of the first user received from the first mobile terminal 200a to the second mobile terminal 200b. In this case, the first mobile terminal 200a can transmit the destination information of the first user, together with the movement route information and the current location information of the first user, to the second mobile terminal 200b via the location information sharing server 400. The second mobile terminal 200b can display the movement route, the current location, and the destination of the first user, which have been transmitted from the location information sharing server 400, on the display unit (not shown) of the second mobile terminal 200b using a mobile web viewer.

The first mobile terminal 200a determines whether the current location of the first user estimated by the location estimation unit 250a is approximate or identical to the destination of the first user input to the user input unit 240a. If it is determined that the estimated current location of the first user is approximate or identical to the destination, the first mobile terminal 200a displays a message notifying the first user of arrival at the destination on the display unit 280a. In this case, the determination of whether the current location of the first user estimated by the location estimation unit 250a is approximate or identical to the destination of the first user input to the user input unit 240a can be performed by the location estimation unit 250a or the control unit 290a, but the present invention is not especially limited thereto.

The first mobile terminal 200a sends the notification message indicating the arrival of the first user at the destination to the location information sharing server 400 via the communication unit 260a. The location information sharing server 400 sends the notification message, indicating the arrival of the first user at the destination and received from the first mobile terminal 200a, to the second mobile terminal 200b. The second mobile terminal 200b can display the message, indicating the arrival of the first user at the destination and received from the location information sharing server 400, on the display unit (not shown) thereof.

For convenience of description, only operations for sharing the movement route information, current location information, destination information, and destination arrival notification message of the first user having the first mobile terminal 200a with the second user having the second mobile terminal 200b have been described. However, in the reverse case, it is apparent that the operations of sharing the movement route information, current location information, destination information, and destination arrival notification message of the second user having the second mobile terminal 200b with the first user having the first mobile terminal 200a are identical to the above operations.

Meanwhile, when the communication connection operation performed between the first mobile terminal 200a and the second mobile terminal 200b to allow the first user having the first mobile terminal 200a and the second user having the second mobile terminal 200b to share the movement route information, current location information, destination information, and destination arrival notification message of the first user with each other fails because a communication connection request has been denied by the other party, or a network failure has occurred, the present invention can change a current service type to a service type for unidirectionally providing location information and displaying a destination arrival notification message, rather than the service type for bidirectionally sharing location information and a destination arrival notification message between the first and second mobile terminals 200a and 200b. That is, when the communication connection operation between the first mobile terminal 200a and the second mobile terminal 200b fails, the operation of sharing movement route information, current location information, destination information, and a destination arrival notification message is not performed among the first mobile terminal 200a, the second mobile terminal 200b, and the location information sharing server 400. In this case, the first mobile terminal 200a displays the current location of the first user estimated by the location estimation unit 250a to the first user on the display unit 280a. Further, if the estimated current location of the first user is approximate or identical to the destination of the first user input to the user input unit 240a, the first mobile terminal 200a displays a notification message indicating the arrival of the first user at the destination to the first user on the display unit 280a.

Hereinafter, a method of sharing location information between users according to the present invention will be described in detail. In the description of the method, the description of some repeated portions identical to the operations performed among the mobile terminals, the public transportation information system, the public transportation, and the location information sharing server according to the present invention, which have been described with reference to FIG. 3, will be omitted here.

Figure 4:
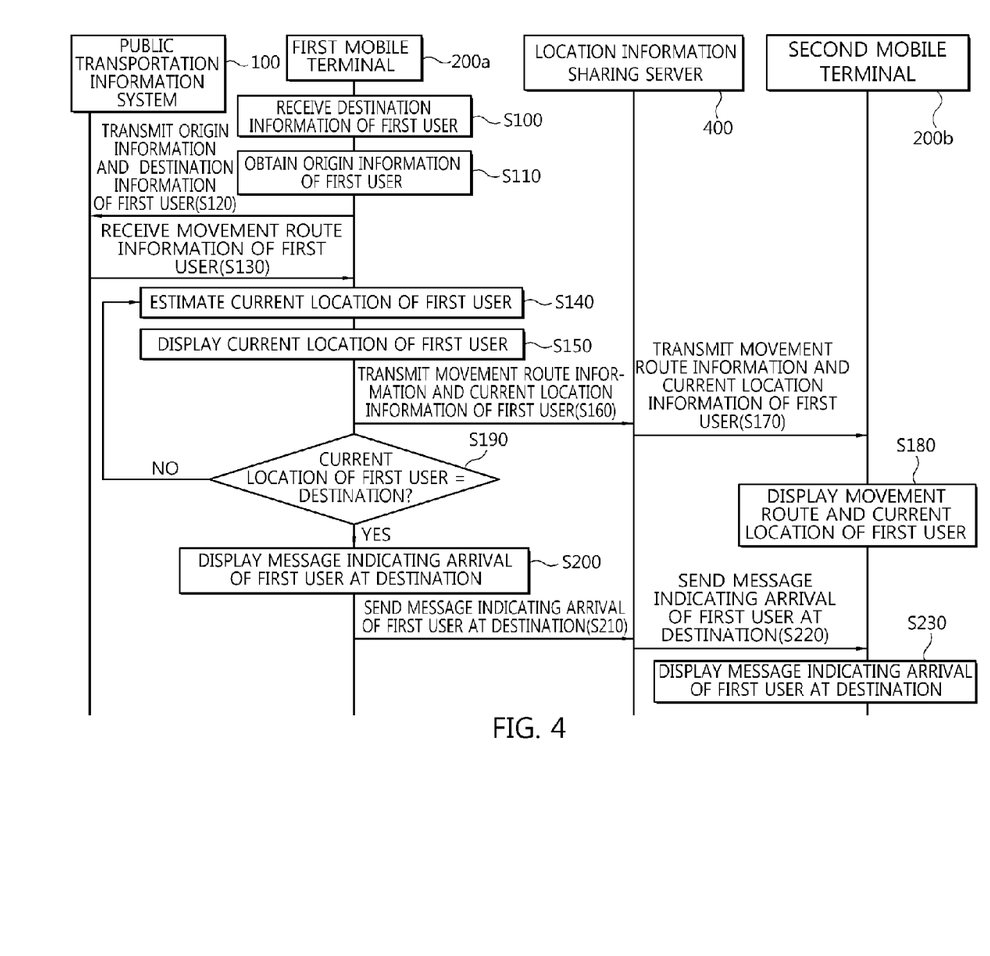
FIGS. 4 to 6 are flowcharts showing a method of sharing location information between users according to the present invention.

FIG. 4 is a flowchart showing a method of sharing location information between users according to the present invention.

Referring to FIG. 4, in the method of sharing location information between users according to the present invention, the first mobile terminal 200a receives information about a desired destination to head for from a first user via the user input unit at step S100, and obtains information about the origin of the first user from the GPS module or the NFC tag reader at step S110.

Next, the first mobile terminal 200a transmits the origin information and the destination information of the first user to the public transportation information system 100 via the communication unit at step S120, and receives information about the movement route of the first user that has the origin as a starting point and the destination as an end point from the public transportation information system 100 at step S130.

Further, the first mobile terminal 200a calculates a movement distance to time required for the first user to move based on the origin information and the movement route information of the first user, estimates the current location of the first user at step S140, and displays the estimated current location of the first user on the display unit at step S150. Here, the current location of the first user can be displayed on the movement route of the first user received from the public transportation information system 100 by using a mobile web viewer supported by a web interface provision module.

Next, the first mobile terminal 200a transmits the movement route information of the first user received from the public transportation information system 100 and the estimated current location information of the first user to the location information sharing server 400 at step S160. The location information sharing server 400 transmits the movement route information and the current location information of the first user received from the first mobile terminal 200*a* to the second mobile terminal 200*b* at step S170. At steps S160 and 170, the first mobile terminal 200*a* may transmit the destination information of the first user input to the user input unit to the second mobile terminal 200*b* via the location information sharing server 400. Further, the second mobile terminal 200*b* displays the movement route information and the current location information of the first user received from the location information sharing server 400 to the second user on the display unit at step S180. In this case, the second mobile terminal 200*b* can display the current location of the first user received from the location information sharing server 400 on the movement route of the first user by using the mobile web viewer supported by the web interface provision module. Furthermore, when the second mobile terminal 200*b* receives the destination information of the first user from the location information sharing server 400, the second mobile terminal 200*b* may display the destination of the first user. Although not shown in FIG. 4, it is apparent that when the first mobile terminal 200*a* also receives the movement route information and the current location information of the second user from the location information sharing server 400 via the communication unit in accordance with step S180, the received information can be displayed to the first user on the display unit.

Meanwhile, the first mobile terminal 200*a* determines whether the estimated current location of the first user is approximate or identical to the destination of the first user input to the user input unit at step S190.

If it is determined at step S190 that the estimated current location of the first user is approximate or identical to the destination of the first user input to the user input unit, the first mobile terminal 200*a* displays a notification message indicating the arrival of the first user at the destination to the first user on the display unit at step S200, and sends the message indicating the arrival of the first user at the destination to the location information sharing server 400 via the communication unit at step S210. The location information sharing server 400 that has received the message indicating the arrival of the first user at the destination from the first mobile terminal 200*a* sends the message to the second mobile terminal 200*b* at step S220. The second mobile terminal 200*b* displays the message, indicating the arrival of the first user at the destination and received from the location information sharing server 400, to the second user via the communication unit at step S230.

In contrast, if it is determined at step S190 that the estimated current location of the first user is neither approximate nor identical to the destination of the first user input to the user input unit, steps S140 to S180 are repeatedly performed until the estimated current location of the first user becomes approximate or identical to the destination of the first user input to the user input unit.

Figure 5:
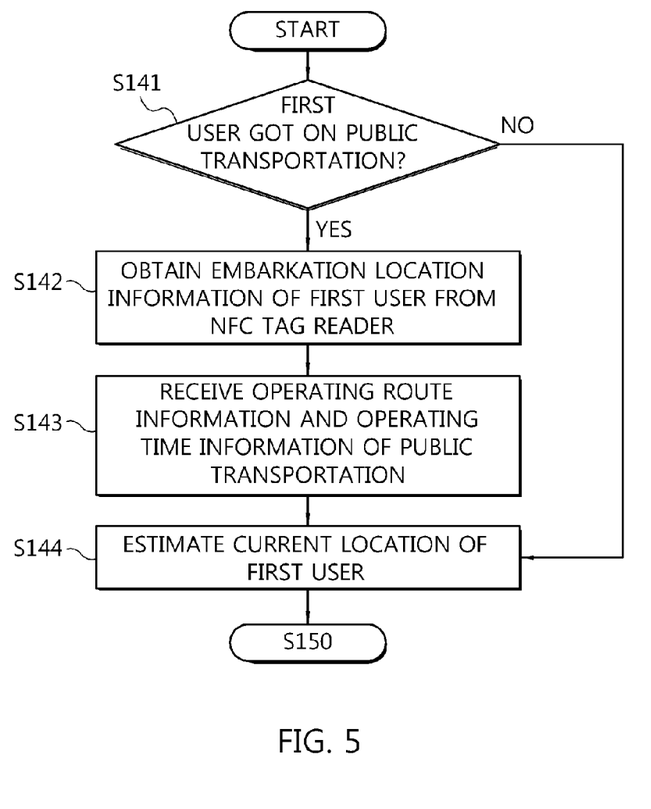

FIG. 5 is a flowchart showing, in detail, step S140 at which the first mobile terminal 200*a* estimates the current location of the first user in the flowchart of FIG. 4.

Referring to FIG. 5, at step S140 at which the first mobile terminal 200*a* estimates the current location of the first user, the first mobile terminal 200*a* determines whether the first user having the first mobile terminal 200*a* has got on public transportation at step S141. At step S141, the determination of whether the first user has got on the public transportation can be performed depending on whether the first user has got on the public transportation and then made payment by putting the NFC tag reader of the first mobile terminal 200*a* close to the NFC tag provided in the public transportation.

If it is determined at step S141 that the first user has got on the public transportation, the first mobile terminal 200*a* obtains embarkation location information as the origin information of the first user from the NFC tag reader put close to the NFC tag of the public transportation which the first user has got on at step S142, and receives the operating route information and the operating time information of the public transportation which the first user has got on from the public transportation information system at step S143. Further, the first mobile terminal 200*a* considers the current movement location of the public transportation which the first user has got on to be identical to the current movement location of the first user, and estimates the current location of the first user on the basis of embarkation location information as the origin information of the first user obtained at step S142 and the operating route information and operating time information of the public transportation received at step S143 at step S144.

In contrast, if it is determined at step S141 that the first user has not got on the public transportation, the first mobile terminal 200*a* estimates the current location of the first user based on the origin information of the first user and the movement route information of the first user received from the public transportation information system in consideration of time required for the first user to move to the current location at step S144. In this case, the origin information of the first user may be origin information obtained from the GPS module or disembarkation location information obtained from the NFC tag reader put close to the NFC tag when the first user gets off the public transportation.

Figure 6:
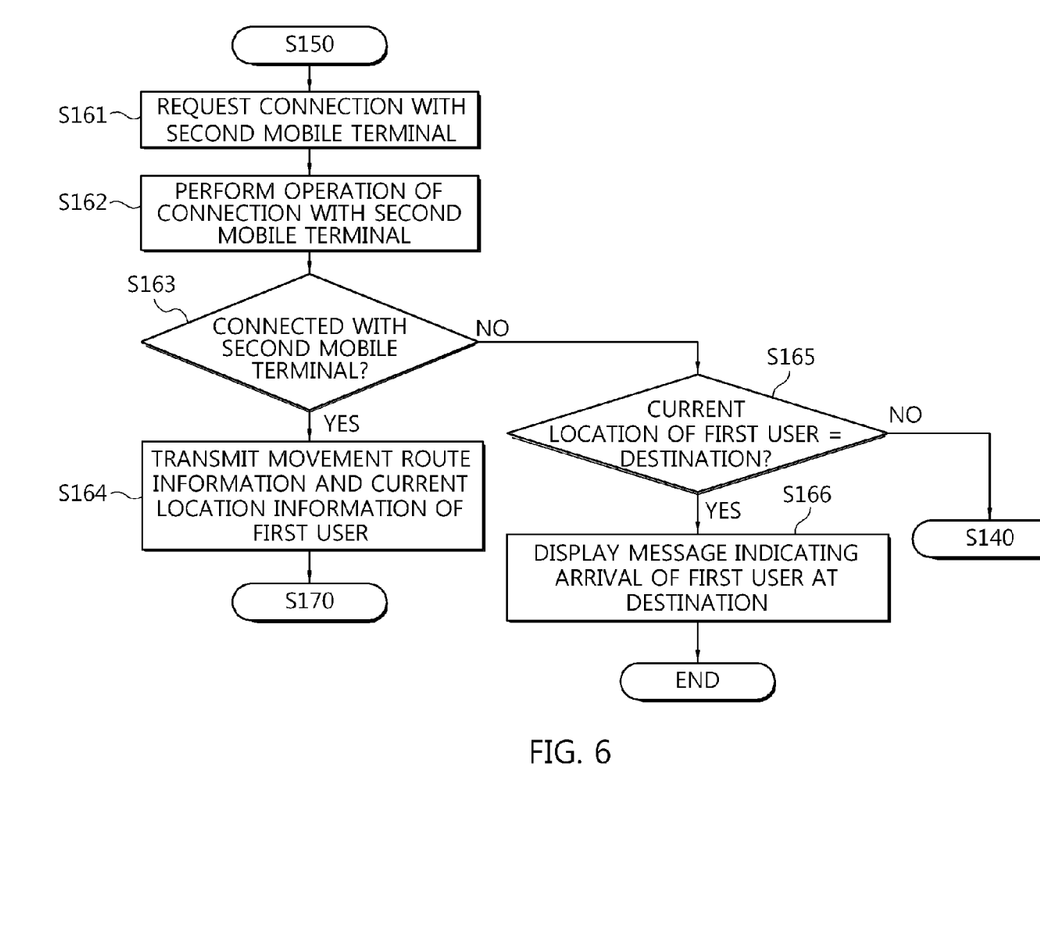

FIG. 6 is a flowchart showing, in detail, step S160 at which the first mobile terminal 200*a* transmits the movement route information and the current location information of the first user to the location information sharing server 400 in the flowchart shown in FIG. 4.

Referring to FIG. 6, at step S160 at which the first mobile terminal 200*a* transmits the movement route information and the current location information of the first user to the location information sharing server 400, the first mobile terminal 200*a* requests communication connection with the second mobile terminal 200*b* from the location information sharing server 400 at step S161. The location information sharing server 400 performs the operation of connecting communication with the second mobile terminal 200*b* at step S162.

If, as a result of performing the communication connection operation by the location information sharing server 400 at step S162, the communication connection with the second mobile terminal 200*b* has been established at step S163, the first mobile terminal 200*a* transmits the movement route information and the current location information of the first user to the location information sharing server 400 at step S164. Then, step S170 is performed at which the location information sharing server 400 transmits the movement route information and the current location information of the first user received from the first mobile terminal 200*a* to the second mobile terminal 200*b*.

In contrast, if, as a result of performing the communication connection operation by the location information sharing server 400 at step S162, the communication connection with the second mobile terminal 200*b* has failed, the present invention performs a service for unidirectionally providing location information and displaying a destination arrival notification message, rather than a service for bidirectionally sharing location information and a destination arrival notification message between the first mobile terminal 200*a* and the second mobile terminal 200b. In this case, the first mobile terminal 200a determines whether the estimated current location of the first user is approximate or identical to the destination of the first user input to the user input unit at step S165. If it is determined at step S165 that the estimated current location of the first user is approximate or identical to the destination of the user input to the user input unit, the first mobile terminal 200a displays a notification message indicating the arrival of the first user at the destination to the first user on the display unit at step S166. In contrast, if it is determined at step S165 that the estimated current location of the first user is neither approximate nor identical to the destination of the first user input to the user input unit, step S140 is repeatedly performed at which the current location of the first user is estimated.

In accordance with the present invention, there is provided technology for allowing a plurality of users having mobile terminals to bidirectionally share the current location information, movement route information, and destination arrival notification messages with one another, rather than technology for unidirectionally providing current location information and displaying a destination arrival notification message to a single user having a mobile terminal. Accordingly, there is an advantage in that limitations attributable to the unidirectionality and the provision of limited location information of the conventional notification service that indicates a current location and arrival at a destination can be overcome.

Further, in accordance with the present invention, technology for estimating the current location of a user having a mobile terminal in conjunction with an NFC device provided in public transportation is provided, thus obtaining the advantage of solving the problem of increased power consumption of a conventional mobile terminal that continuously uses a GPS module to estimate the current location of a user.

As described above, optimal embodiments of a mobile terminal and method for sharing location information between users according to the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A mobile terminal for sharing location information between users, comprising:
   a user input unit for receiving destination information of a first user from the first user;
   a location information input unit for receiving origin information of the first user from a Global Positioning System (GPS) or a Near-Field Communication (NFC) payment module of public transportation which the first user gets on;
   a communication unit for transmitting the origin information and the destination information of the first user to a public transportation information system, and receiving movement route information of the first user from the public transportation information system; and
   a location estimation unit for estimating a current location of the first user using time required by the first user to move to the current location, based on the movement route information,
   wherein the communication unit transmits the movement route information and the current location information to a location information sharing server, and receives movement route information and current location information of a second user from the location information sharing server,
   wherein the user input unit is capable of receiving a command to select whether to move by walking or by public transportation from the first user, and
   wherein if the first user selects movement by walking, the location information input unit receives the origin information of the first user from the GPS, and if the first user selects movement by public transportation, the location information input unit receives the origin information of the first user from the NFC tag reader.

2. The mobile terminal of claim 1, wherein the origin information is input to the location information input unit via an NFC tag reader put close to an NFC tag of public transportation which the first user gets on when the first user gets on the public transportation.

3. The mobile terminal of claim 2, wherein the communication unit receives operating route information and operating time information of the public transportation which the first user gets on from the public transportation information system.

4. The mobile terminal of claim 3, wherein the location estimation unit further estimates the current location of the first user using the origin information of the first user input from the NFC tag reader and the operating route information and the operating time information received from the public transportation information system.

5. The mobile terminal of claim 4, further comprising a display unit for displaying the movement route and the current location of the first user or displaying the movement route and the current location of the second user.

6. The mobile terminal of claim 5, wherein the display unit displays the current location of the first user on the movement route of the first user or the current location of the second user on the movement route of the second user using a mobile web viewer.

7. The mobile terminal of claim 5, wherein if the current location of the first user estimated by the location estimation unit is identical to the destination of the first user input to the user input unit, the display unit displays a message indicating arrival of the first user at the destination.

8. The mobile terminal of claim 7, wherein:
   the communication unit sends the message indicating the arrival of the first user at the destination to the location information sharing server, and receives a message indicating arrival of the second user at the destination from the location information sharing server, and
   the display unit displays the message, indicating the arrival of the second user at the destination and received from the location information sharing server.

9. The mobile terminal of claim 1, wherein the location information input unit is capable of receiving the origin information of the first user from the first user.

10. A method of sharing location information between users, comprising:
    a first mobile terminal receiving destination information of a first user and a command to select whether to move by walking or by public transportation from the first user;
    if the first user selects movement by walking, the first mobile terminal receiving origin information of the first user from a Global Positioning System (GPS), and if the first user selects movement by public transportation, the first mobile terminal receiving the origin information of the first user from a Near-Field Communication (NFC) payment module of public transportation which the first user gets on;

the first mobile terminal transmitting the origin information and the destination information of the first user to a public transportation information system;

the first mobile terminal receiving movement route information corresponding to the origin information and the destination information of the first user from the public transportation information system;

the first mobile terminal estimating a current location of the first user using time required by the first user to move to the current location, based on the movement route information;

the first mobile terminal transmitting the movement route information and the current location information of the first user to a location information sharing server; and the first mobile terminal displaying movement route information and current location information of a second user.

11. The method of claim 10, wherein the estimating the current location of the first user comprises:

if the first user gets on public transportation, the first mobile terminal obtaining origin information of the first user from an NFC tag reader put close to an NFC tag of the public transportation which the first user gets on.

12. The method of claim 11, wherein the estimating the current location of the first user further comprises:

the first mobile terminal receiving operating route information and operating time information of the public transportation which the first user gets on from the public transportation information system.

13. The method of claim 12, wherein the estimating the current location of the first user further comprises:

the first mobile terminal estimating the current location of the first user using the origin information of the first user input from the NFC tag reader and the operating route information and the operating time information received from the public transportation information system.

14. The method of claim 10, wherein the first mobile terminal transmitting the movement route information and the current location information of the first user to the location information sharing server comprises:

the first mobile terminal requesting communication connection with the second mobile terminal from the location information sharing server; and if the communication connection with the second mobile terminal has been established by the location information sharing server, the first mobile terminal transmitting the movement route information and the current location information of the first user to the location information sharing server.

15. The method of claim 10, further comprising:

after the first mobile terminal has estimated the current location of the first user, the first mobile terminal displaying the estimated current location of the first user.

16. The method of claim 10, further comprising:

determining whether the estimated current location of the first user is identical to the destination of the first user; and if the estimated current location of the first user is identical to the destination of the first user, the first mobile terminal displaying a message indicating arrival of the first user at the destination.

17. The method of claim 16, further comprising:

the first mobile terminal sending the message indicating the arrival of the first user at the destination to the location information sharing server;

the location information sharing server sending the message indicating the arrival of the first user at the destination to the second mobile terminal; and the second mobile terminal displaying the message indicating the arrival of the first user at the destination.

* * * * *